(12) United States Patent
Jacobsen et al.

(10) Patent No.: US 6,170,162 B1
(45) Date of Patent: Jan. 9, 2001

(54) ROTARY DISPLACEMENT SYSTEM USING DIFFERENTIAL MEASURING

(75) Inventors: Stephen C. Jacobsen; Michael G. Mladejovsky, both of Salt Lake City, UT (US)

(73) Assignee: Sarcos, L.C., Salt Lake City, UT (US)

( * ) Notice: Under 35 U.S.C. 154(b), the term of this patent shall be extended for 0 days.

(21) Appl. No.: 09/320,593

(22) Filed: May 27, 1999

(51) Int. Cl.[7] ............................................. G01B 7/30
(52) U.S. Cl. .................................................. 33/1 PT
(58) Field of Search ........................... 33/1 N, 1 PT, 33/534, 762, 763, 706

(56) References Cited

U.S. PATENT DOCUMENTS

| | | |
|---|---|---|
| 3,218,635 | 11/1965 | Masur . |
| 4,719,449 * | 1/1988 | Cousseau ............................ 33/1 PT |
| 4,851,835 | 7/1989 | Krumholz et al. . |
| 4,972,599 * | 11/1990 | Ernst ................................. 33/1 PT |
| 4,991,301 * | 2/1991 | Hore .................................. 33/1 PT |
| 5,311,666 | 5/1994 | Jacobsen et al. ..................... 33/1 N |

FOREIGN PATENT DOCUMENTS

| | | | |
|---|---|---|---|
| 1296724 | 5/1961 | (FR) . | |
| 2176013 * | 12/1986 | (GB) | ................................. 33/1 PT |
| 2639708 * | 12/1986 | (FR) | ................................. 33/1 PT |
| WO 84/00261 | 1/1984 | (WO) . | |

* cited by examiner

*Primary Examiner*—G. Bradley Bennett
(74) *Attorney, Agent, or Firm*—Thorpe, North & Western, LLP

(57) ABSTRACT

A rotary displacement measuring apparatus includes an axle whose rotary displacement is to be determined, with the axle being mounted to rotate about its long axis. An emitter disk is mounted on the axle to define a plurality of concentric tracks circumscribing the axle to rotate as the axle rotates, with each of the tracks being segmented to define a plurality of spaced-apart, conductive sections for producing electric fields when energized. Also included is a voltage source for energizing the conductive sections. A detector is disposed adjacent to the tracks of the emitter disk and includes a plurality of sensors, each positioned adjacent a respective track to detect the electric fields of the respective track as the axle and tracks are rotated. The detector produces signals representing the detection of the electric fields as the emitter disk is rotated, and these signals provide an indication of the rotary displacement of the tracks and thus of the axle.

29 Claims, 8 Drawing Sheets

|  |  | FINE $2^{16}$ | COARSE $2^4$ |  |
|---|---|---|---|---|
| 0.003 | 3 | 0000111111111111 | 11011111 |  |
| 1.346 | 1208 | 0000011111111111 | 11011111 |  |
| 2.766 | 1278 | 0000001111111111 | 11011111 |  |
| 4.211 | 1301 | 0000000111111111 | 11011111 |  |
| 5.572 | 1225 | 0000000011111111 | 11011111 | Coarse Detector State Change |
| 7.021 | 1304 | 0000000001111111 | 11001111 |  |
| 8.418 | 1257 | 0000000000111111 | 11001111 |  |
| 9.821 | 1263 | 0000000000011111 | 11001111 |  |
| 11.228 | 1266 | 0000000000001111 | 11001111 |  |
| 12.628 | 1260 | 0000000000000111 | 11001111 |  |
| 14.043 | 1274 | 0000000000000011 | 11001111 |  |
| 15.421 | 1240 | 0000000000000001 | 11001111 |  |
| 16.843 | 1280 | 1000000000000000 | 11001111 |  |
| 19.659 | 2534 | 1100000000000000 | 11001111 |  |
| 21.072 | 1272 | 1110000000000000 | 11001111 |  |
| 22.459 | 1248 | 1111000000000000 | 11001111 |  |
| 23.859 | 1260 | 1111100000000000 | 11001111 |  |
| 25.260 | 1261 | 1111110000000000 | 11001111 |  |
| 26.638 | 1240 | 1111111000000000 | 11001111 |  |
| 28.104 | 1320 | 1111111100000000 | 11001111 | Coarse Detector State Change |
| 29.453 | 1214 | 1111111110000000 | 11101111 |  |
| 30.871 | 1276 | 1111111111000000 | 11101111 |  |
| 32.290 | 1277 | 1111111111100000 | 11101111 |  |
| 33.696 | 1265 | 1111111111110000 | 11101111 |  |
| 35.112 | 1275 | 1111111111111000 | 11101111 |  |
| 36.520 | 1267 | 1111111111111100 | 11101111 |  |
| 37.947 | 1284 | 1111111111111110 | 11101111 |  |
| 39.324 | 1240 | 0111111111111111 | 11101111 |  |
| 42.068 | 246 | 0011111111111111 | 11101111 |  |
| 43.446 | 1240 | 0001111111111111 | 11101111 |  |
| 44.876 | 1287 | 0000111111111111 | 11101111 |  |
| 46.273 | 1258 | 0000011111111111 | 11101111 |  |
| 47.700 | 1284 | 0000001111111111 | 11101111 |  |
| 49.134 | 1291 | 0000000111111111 | 11101111 |  |
| 50.503 | 1232 | 0000000011111111 | 11101111 | Coarse Detector State Change |
| 51.961 | 1312 | 0000000001111111 | 11100111 |  |
| 53.364 | 1263 | 0000000000111111 | 11100111 |  |
| 54.756 | 1252 | 0000000000011111 | 11100111 |  |
| 56.167 | 1270 | 0000000000001111 | 11100111 |  |
| 57.563 | 1257 | 0000000000000111 | 11100111 |  |
| 58.981 | 1276 | 0000000000000011 | 11100111 |  |
| 60.350 | 1232 | 0000000000000001 | 11100111 |  |
| 61.772 | 1280 | 1000000000000000 | 11100111 |  |
| 64.592 | 2538 | 1100000000000000 | 11100111 |  |
| 66.007 | 1273 | 1110000000000000 | 11100111 |  |
| 67.393 | 1248 | 1111000000000000 | 11100111 |  |
| 68.798 | 1264 | 1111100000000000 | 11100111 |  |
| 70.196 | 1258 | 1111110000000000 | 11100111 |  |
| 71.576 | 1242 | 1111111000000000 | 11100111 |  |
| 73.038 | 1316 | 1111111100000000 | 11100111 | Coarse Detector State Change |
| 74.373 | 1202 | 1111111110000000 | 11110111 |  |
| 75.796 | 1280 | 1111111111000000 | 11110111 |  |
| 77.216 | 1278 | 1111111111100000 | 11110111 |  |
| 78.621 | 1265 | 1111111111110000 | 11110111 |  |
| 80.033 | 1271 | 1111111111111000 | 11110111 |  |
| 81.440 | 1266 | 1111111111111100 | 11110111 |  |
| 82.870 | 1287 | 1111111111111110 | 11110111 |  |
| 84.244 | 1237 | 0111111111111111 | 11110111 |  |
| 87.002 | 2482 | 1011111111111111 | 11110111 |  |
| 88.384 | 1244 | 0001111111111111 | 11110111 |  |
| 89.811 | 1284 | 0000111111111111 | 11110111 |  |
| 91.211 | 1260 | 0000011111111111 | 11110111 |  |
| 92.637 | 1283 | 0000001111111111 | 11110111 |  |
| 94.068 | 1288 | 0000000111111111 | 11110111 |  |
| 95.426 | 1222 | 0000000011111111 | 11110111 |  |

| Four Phases of Operation | ISO | BIAS~ |
|---|---|---|
| Balance | 1 | 0 |
| Charge Injection | 0 | 0 |
| Amplification | 0 | 1 |
| Latch | 1 | 1 |

|  | 145 | 146 |  |  |  | RIGHT ARRAY 74<br>HUMP 149 | LEFT ARRAY 78<br>HUMP 149 |
|---|---|---|---|---|---|---|---|
| ANGLE | POS(R) | POS(L) | SUM(Σ) | POSITION | ERROR | 148 |  |
| 0.4219 | 28 | 29 | 57 | 0.428 | 0.0066 | 1111110000000001 | 1111110000000011 |
| 0.4373 | 28 | 30 | 58 | 0.439 | 0.0022 | 1111110000000001 | 1111110000000111 |
| 0.4438 | 29 | 30 | 59 | 0.450 | 0.0066 | 1111110000000011 | 1111110000000111 |
| 0.4504 | 30 | 30 | 60 | 0.461 | 0.0110 | 1111100000000011 | 1111110000000111 |
| 0.4702 | 30 | 31 | 61 | 0.472 | 0.0022 | 1111100000000011 | 1111100000000111 |
| 0.4834 | 31 | 31 | 62 | 0.483 | 0.0000 | 1111100000000111 | 1111100000000111 |
| 0.4856 | 31 | 32 | 63 | 0.494 | 0.0088 | 1111100000000111 | 1111100000001111 |
| 0.4922 | 32 | 32 | 64 | 0.505 | 0.0132 | 1111100000000111 | 1111100000001111 |
| 0.5164 | 32 | 33 | 65 | 0.516 | 0.0000 | 1111100000000111 | 1111100000001111 |
| 0.5229 | 33 | 33 | 66 | 0.527 | 0.0044 | 1111100000001111 | 1111100000001111 |
| 0.5317 | 34 | 33 | 67 | 0.538 | 0.0066 | 1110000000001111 | 1111000000001111 |
| 0.5339 | 34 | 34 | 68 | 0.549 | 0.0154 | 1110000000001111 | 1111000000011111 |
| 0.5625 | 35 | 34 | 69 | 0.560 | -0.0022 | 1110000000011111 | 1111000000011111 |
| 0.5647 | 35 | 35 | 70 | 0.571 | 0.0066 | 1110000000011111 | 1110000000011111 |
| 0.5713 | 36 | 35 | 71 | 0.582 | 0.0110 | 1100000000011111 | 1110000000011111 |
| 0.5801 | 36 | 36 | 72 | 0.593 | 0.0132 | 1100000000011111 | 1110000000111111 |
| 0.6042 | 37 | 36 | 73 | 0.604 | 0.0000 | 1100000000111111 | 1110000000111111 |
| 0.6108 | 38 | 36 | 74 | 0.615 | 0.0044 | 1000000000111111 | 1110000000111111 |
| 0.6130 | 38 | 37 | 75 | 0.626 | 0.0132 | 1000000000111111 | 1100000000111111 |
| 0.6284 | 38 | 38 | 76 | 0.637 | 0.0088 | 1000000000111111 | 1100000001111111 |
| 0.6438 | 39 | 38 | 77 | 0.648 | 0.0044 | 1000000001111111 | 1100000001111111 |
| 0.6526 | 40 | 38 | 78 | 0.659 | 0.0066 | 0000000001111111 | 1100000001111111 |
| 0.6614 | 40 | 39 | 79 | 0.670 | 0.0088 | 0000000001111111 | 1000000001111111 |
| 0.6768 | 40 | 40 | 80 | 0.681 | 0.0044 | 0000000001111111 | 1000000011111111 |
| 0.6833 | 41 | 40 | 81 | 0.692 | 0.0088 | 0000000011111111 | 1000000011111111 |
| 0.6921 | 41 | 41 | 82 | 0.703 | 0.0110 | 0000000011111111 | 1000000011111110 |
| 0.7075 | 41 | 42 | 83 | 0.714 | 0.0066 | 0000000011111111 | 0000000011111110 |

"NOMINAL" HUMP TEMPLATES 1 1 1 1 1 1 1 1 0 0 0 0 0 0 0 0    T0
0 1 1 1 1 1 1 1 1 0 0 0 0 0 0 0    T1
⋮
0 0 0 0 0 0 0 0 1 1 1 1 1 1 1 1    T15

ROTARY DISPLACEMENT SYSTEM USING DIFFERENTIAL MEASURING

BACKGROUND OF THE INVENTION

This invention relates to a new, improved and precise rotary displacement measuring system in which both absolute and relative measurements of rotary position may be made, with compensation for run out (mechanical wobble or misalignment).

In the operation of various mechanical and electromechanical systems, it is necessary to monitor the position and displacement of either some element of the system or some object which is not part of the system. For example, in robotic systems it is almost always necessary to monitor and control the movement and position of various component parts of the systems, such as an arm, fingers or other grasping elements, etc. Such monitoring and control yields the dexterity and precision required for a robotic system to carry out its functions.

Two types of position and displacement measurement may be required in the above-described systems, these being linear displacement and position, and angular or rotary displacement and position. Prior art mechanisms for sensing rotary position and displacement most often utilized a direct connection between the article or object whose position or displacement is to be monitored, and some type of gauge, needle or other visual indicator. Of course, such mechanisms were typically large, cumbersome, unreliable, and lacked precision in carrying out the monitoring function.

A number of electrical and electronic devices have been proposed for measuring angular position and displacement including so-called rotary variable differential transformers, such as described in U.S. Pat. No. 4,910,488. These devices provide for measuring angular displacement by converting mechanical rotation into an analog electrical signal, which may then be connected to a digital output by a conventional A/D converter. In U.S. Pat. No. 4,851,835, a so-called rotary transmitter is disclosed in which rotation of a rotor relative to a pair of stators is determined by variation in capacitance between the rotor and at least one of the stators as the rotor turns. Some prior art rotary measuring devices use several detectors to detect capacitance between the detectors and an emitter but then the outputs from the detectors are integrated to produce a single output signal which is typically analog. As noted above, this analog signal may then be converted to a digital signal for use and interpretation by the user. Finally, prior art devices have typically utilized multiple inputs to excite an emitter and in particular certain sections or segments on the emitter causing it to emit different strength electric fields (usually different phases of an AC excitation signal). Detection of the rotary position of the emitter (or detector) relative to the detector (or emitter) is then made by detecting the variation in strength or phase of the emitted fields.

The above-mentioned electrical and electronic measuring devices, although reducing the bulkiness and imprecision problems of the prior art mechanisms, such devices still do not allow for the precision oftentimes desired in the mechanical and electromechanical systems in use or contemplated for use at the present time.

Other types of rotary displacement and position measuring transducers include resistance-based voltage dividers and optical encoders, both of which also suffer from one or more of the disadvantages mentioned above. For example, while optical encoders have made improvements in the precision of measurements, the devices are still relatively bulky because increased precision is obtained through increasing the number of sensors or other methods which require increased detector surface area.

A further drawback is that the rotary displacement and position measuring transducers above typically use a single type of encoder, either absolute or incremental. The precision of absolute encoders has been poor relative to incremental encoders, but incremental encoders require indexing to find a reference point for movement.

Therefore, it would be an improvement over the prior art to combine the precision of an incremental encoder with the benefits of an absolute encoder so as to provide a rotary displacement and position measuring transducer which is much smaller than the prior art, compensates for run out, and avoids the errors inherent in an analog based system by using geometric quantization to produce a desired digital output representing angular position.

SUMMARY OF THE INVENTION

It is an object of the invention to provide a simple, reliable and precise apparatus and method for measuring angular position.

It is another object of the invention to provide such apparatus which is especially compact, contains few moving parts and requires few wires.

It is a further object of the invention to provide such apparatus which is simple to manufacture, lending itself to very large scale integration (VLSI) fabrication techniques.

It is also an object of the invention to provide such apparatus in which a plurality of discrete signals are developed to provide a precise indication of rotary position.

It is still another object of the invention to provide such apparatus requiring only a single input connection to excite a rotating emitter disk uniformly over its surface, with rotary position being determined by variation in location of an emitted electric field rather than variation in strength or phase of an electric field.

It is an additional object of the invention to provide such apparatus which compensates for misalignment of emitter disk elements and detector elements.

An additional object is to simultaneously produce absolute and high resolution incremental outputs.

The above and other objects of the invention are realized in a specific illustrative embodiment of a rotary displacement measuring system which includes a shaft whose rotary displacement is to be measured, mounted to rotate about its long axis, and an emitter disk coupled to the shaft to rotate as the shaft is rotated. In response to a single time varying voltage, the emitter disk develops electric fields at predetermined locations on the emitter disk, such locations varying circumferentially on the emitter disk. Also included is an array of detectors disposed in close proximity to the emitter disk, adjacent the path traversed when the emitter disk is rotated, to detect variation in locations of the electric fields as the emitter disk is rotated and to produce output signals representing variations in the electric field locations. In particular, a plurality of detectors detect variations in locations of electric fields on a plurality of tracks. Such variation provides an indication of the position and displacement of the emitter disk and thus of the shaft.

In accordance with one aspect of the invention, the emitter disk comprises a generally planar disk mounted on the shaft to rotate in the plane defined by the emitter disk and to direct electric fields normally from an active side of the emitter disk from different locations thereon. The detector comprises a generally planar plate disposed in a fixed position to be generally parallel with the emitter disk on the active side thereof to enable detection of variations in the location of electric fields as the emitter disk is rotated. The emitter disk is mechanically biased by a spring toward the detector plate, but out of contact therewith.

In accordance with another aspect of the invention, a plurality of concentric tracks are formed on the active side of the emitter disk, each track including a plurality of spaced-apart, but electrically connected, conductive sections. A conductive layer of material is disposed on the detector plate on the side facing the active side of the emitter disk for developing an electric field to capacitively couple the layer and the track sections when a voltage signal is supplied to the layer. The conductive sections are thus caused to develop time varying electric fields to be detected by the detectors. A voltage supply source supplies a voltage signal to the conductive layer of material on the detector plate.

BRIEF DESCRIPTION OF THE DRAWINGS

The above and other objects, features and advantages of the invention will become apparent from a consideration of the following detailed description presented in connection with the accompanying drawings in which:

FIG. 5 is a table showing exemplary states for the coarse absolute position detectors and fine absolute position detectors of FIG. 3 for different emitter disk rotation angles;

DETAILED DESCRIPTION

Before describing the present invention in detail, a key feature of the present invention which should be remembered is that the structure to be described enables extremely accurate geometric quantization of rotary displacement. In other words, the present invention is able to determine rotary displacement without comparison or conversion of measured signals. It is not the strength or intensity of measured signals which provide rotary displacement information, but rather the differential measurement between complimentary tracks which creates a plurality of reliable binary one-bit signals despite varying gaps between the emitter disk and sensor disk.

Figure 1:
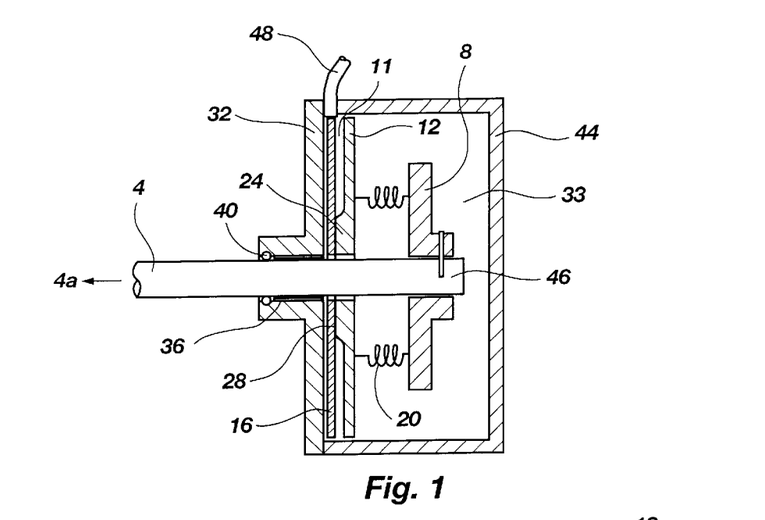
FIG. 1 is a side, cross-sectional view of a rotary displacement measuring system made in accordance with the principles of the present invention.

Referring to FIG. 1, there is shown a side, cross-sectional, fragmented view of one specific illustrative embodiment of a rotary displacement and position measurement transducer made in accordance with the present invention, for measuring the angular displacement or angular position of a shaft 4 which would be coupled at an end 4a to the object or component whose angular displacement is to be measured. The other components of the transducer are mounted about the shaft as will be described.

Attached to the other end 4b of the shaft 4, to rotate therewith, is a support plate 8. Spaced from the support plate 8 and slidable mounted on the shaft 4 to rotate therewith is an emitter disk 12 on which will be developed electric fields at various locations which will be directed towards a fixed detector integrated circuit chip 16. A plurality of torsionally stiff, but longitudinally elastic springs 20 are coupled between the support plate 8 and the emitter disk 12 to (1) cause the disk 12 to rotate when the shaft 4 and plate 8 are rotated, and (2) lightly urge (bias) the emitter disk 12 against the detector chip 16.

The emitter disk 12 includes a slightly raised or thickened annular central section or bearing surface 24 to contact and slide over the detector chip 16 but maintain the remaining portions of the emitter disk out of contact (but in close proximity) with the chip. The gap 11 should be on the order of a few microns. Advantageously, a wear resistant film 28 commonly referred to as a passivation layer is disposed over the raised portion 24 of the emitter disk 12 and/or the central portion of the detector integrated circuit chip 16 which is in contact with the emitter disk, to prevent wear between the disk and the chip. Illustratively, the emitter disk 12 could be made of sapphire formed by ion milling of an aluminum oxide. The detector chip 16 could be a silicon wafer. The wear resistant film 28 could be made of silicon nitride, a material generally having the hardness of diamond.

Another embodiment of the emitter disk and detector plate is simply to provide substantially flat facing surfaces for the emitter disk and plate so that there is light contact between the entire facing surfaces. In this embodiment, the entire surface of the detector and/or emitter disk would advantageously be coated with a wear-resistant layer of material, such as the aforementioned silicon nitride.

In both embodiments of the emitter disk and detector plate construction, the emitter disk is maintained in close proximity to the detector plate and the spacing therebetween is maintained substantially uniform as the emitter disk is caused to rotate.

The detector integrated circuit chip 16 is mounted to a base 32 which is slidable mounted about the shaft 40 but is fixed and does not rotate as the shaft is rotated. Obviously, since the base 32 is fixed and does not rotate and the detector chip 16 is mounted on the base, the detector chip likewise does not rotate. A bearing 36 is disposed between the base 32 and the shaft 40 to allow ease of rotation of the shaft in the base, and a seal 40 is likewise disposed between the base 32 and shaft 40 to prevent entry of contaminants into the area occupied by the emitter disk 12 and detector chip 16.

A cover or cap 44 is placed over the end 4b of the shaft 4 to cover the plate 8, emitter disk 12 and chip 16. A cable assembly 48 extends through the cap 48 to electrically contact the detector chip 16 to provide for exchange of electrical signals therebetween, in a manner described in U.S. Pat. No. 5,311,666 issued to Jacobsen on May 17, 1994, which is incorporated herein by reference. Other component parts for maintaining the transducer in the desired configuration may also be included as fully described in the aforecited parent application. Of particular importance is the dielectric oil which fills the volume 33 defined by the base 32 and the cover 44. The dielectric oil has a high dielectric constant to concentrate electric fields for increasing coupling.

As will be described more fully later, as the shaft 4 is rotated, the emitter disk 12 is also caused to rotate so the electric fields developed by the emitter disk are caused to sweep over the detector chip 16; the detector chip detects the instantaneous position of the electric field and provides an output signal indicating the rotary position of the emitter disk and thus of the shaft 4.

With the above-described transducer assembly of FIG. 1, all electrical connections to the transducer may be made via the cable 48. The shaft 4 whose rotary displacement is to be measured is allowed to rotate freely and, because it fits through central openings in all of the component parts, it also serves to maintain the parts in proper alignment. The component parts are protected from contamination and damage by cover 44 and by the seal 40. As will be described momentarily, the emitter disk 12 and detector integrated circuit chip 16 electronics allow for significant miniaturization and this, in turn, yields high precision in making the rotary displacement measurements.

Figure 2:
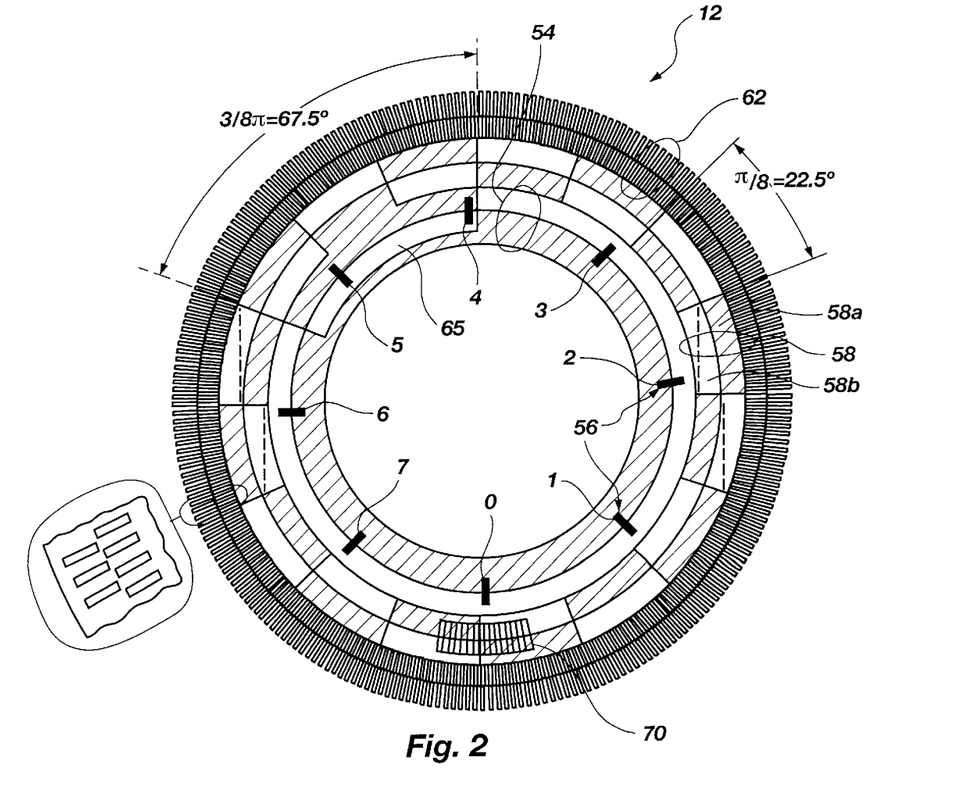
FIG. 2 is a top, plan view of the emitter disk of FIG. 1, showing complimentary segmented emitter disk tracks made in accordance with the principles of the present invention.
Figure 3:
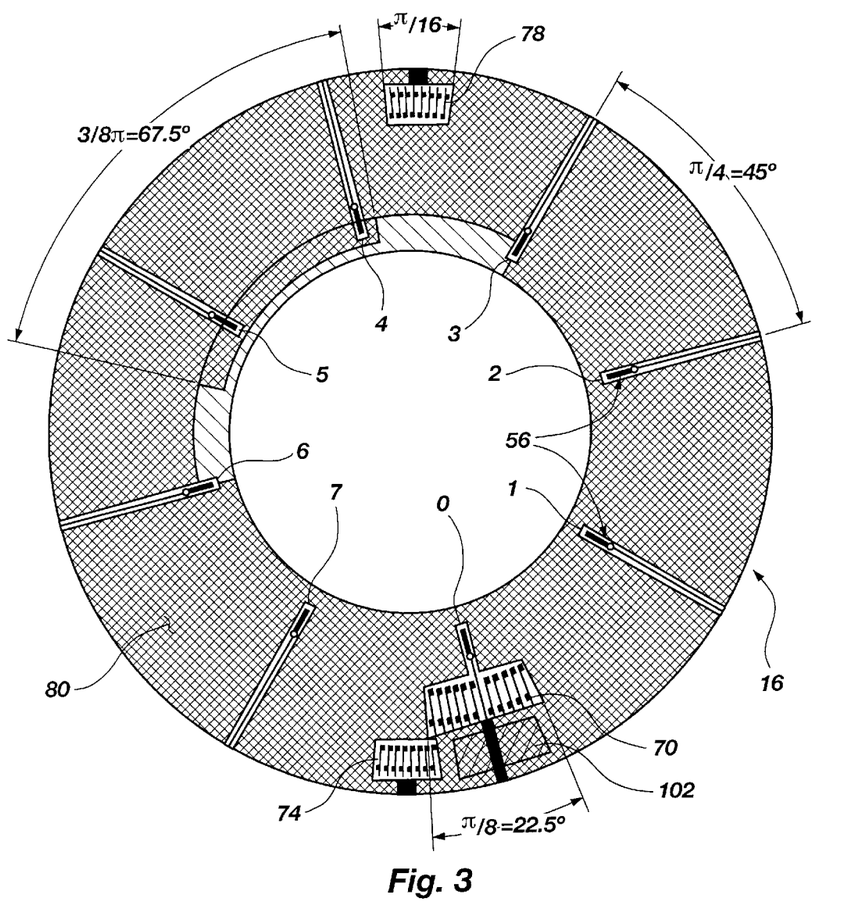
FIG. 3 is a top, plan view of the detector of FIG. 1 showing individual detector arrays in accordance with the principles of the present invention.

FIGS. 2 and 3 show respectively a top, plan view of one illustrative embodiment of the emitter disk 12 of FIG. 1, and a top, plan view of an exemplary detector chip or plate 16. As seen in FIG. 2, an emitter disk 12 is formed with three pairs of complementary or conjugate tracks 54, 58 and 62 formed concentrically on the emitter disk surface, and representing respectively coarse absolute, fine absolute and high resolution incremental positioning tracks. Each of the tracks is formed to include a plurality of spaced-apart conductive segments or sections made, for example, of a layer or film of aluminum or chromium. As will be discussed, the conductive sections may be energized to produce electric fields emanating from the conductive sections and which vary in location circumferentially on the emitter disk 12. The conductive sections are electrically continuous with no isolated regions, to enable electrifying all the sections simultaneously by capacitive coupling as will also be described later.

What may not be apparent about having only three pairs of complementary tracks is the substantial and advantageous reduction in the total number of tracks required to provide precision rotation position information. For example, the prior art has used Gray code which typically required 10 pairs of complementary tracks. The greater the number of tracks which are required to obtain rotary position information, the more susceptible the system is to errors caused by run out. Using a modified Gray code or another appropriate coding scheme, the present invention obtains the same or greater amount of information from fewer track pairs. The present invention is thus inherently less prone to positional errors caused by run out.

Advantageously, the conductive sections are formed to produce a code such that rotation of the emitter disk past specifically placed electric field sensors results in unary (single-bit at a time) changes in the value of the code as the shaft is continuously rotated. The value changes predictably as the emitter disk is rotated. This value is detected to provide the indication of the absolute and incremental rotational displacement (position) of the emitter disk. It is important to note that the emitter disk 12 does not selectively produce electric field emissions from only a particular set of track elements. Instead, all of the metallized tracks are emitting an electrical field because the tracks form one electrically continuous circuit path. This substantially decreases the complexity of the design of the emitter disk.

As already indicated, the tracks are formed as complementary or conjugate pairs 54, 58 and 62. The complementary or conjugate aspect of each pair of tracks is illustrated by reference to segments 58a and 58b of the pair of tracks 58. Segment 58a appears dark in FIG. 2 indicating that it is metallized or is formed of a conductive layer of material whereas the light segment 58b indicates that the emitter disk is clear at that location, thus containing no metallization. Segments 58a and 58b occupy the same circumferential position on the emitter disk but, of course, different radial positions.

Figure 4:
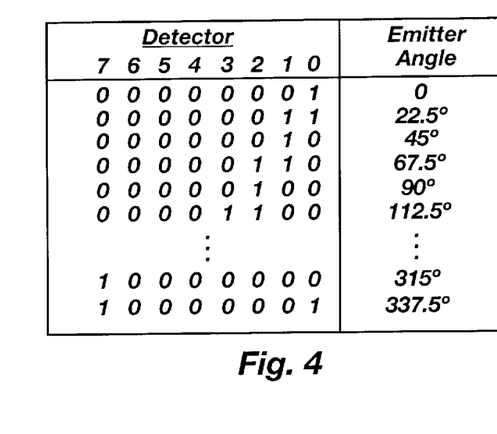
FIG. 4 is a table representing exemplary states of the coarse absolute position detectors of FIG. 3 for different emitter disk rotation angles.

Track pair 54 provides for "coarse" detection of the absolute position of the emitter disk 12 relative to the detector plate 16 shown in FIG. 3. Eight coarse detectors 56 labeled 0 through 7 are circumferentially spaced apart on the detector plate (FIG. 3) and are also shown in FIG. 2 to indicate the positions such detectors occupy relative to the track pair 54. As can be seen in FIG. 2, the coarse detectors 56 straddle the track pair. Since there are eight coarse detectors and because of the metallization pattern of the track pair 54—a 67.5 degree arc 65 which is oppositely metallized from the rest of the track pair—the coarse detectors 56 can provide an indication of absolute position of the emitter disk 12 to resolution of 22.5 degrees. That is, a change will occur in state or read-out of the eight coarse detectors 56, i.e., what the coarse detectors "see" of the track pair 54, every 22.5 degrees of rotation of the emitter disk 12. This is illustrated in FIG. 4 which shows exemplary states or outputs of the detectors 56 for different emitter disk rotational angles. The detectors are identified as 0 through 7 with their states indicating either a "0" or "1," respectively depending on whether or not that particular detector is overlying metal on the inside track of the track pair 54 and non metal on the outside track of the track pair, or overlying non metal on the inside track of the track pair and metal on the outside track. For example, in FIG. 2, detectors 4 and 5 would be in the "1" state since both detectors are overlying metal on the outside track of the track pair 54 and no metal on the inside track, whereas all other coarse detectors are just the opposite and would be in the "0" state. Note in FIG. 4 that with every 22.5 degree rotation of the emitter disk, only one of the eight coarse detectors 56 changes its output or state. Accordingly, the coarse detectors have 16 unique states.

The detectors 0 through 7 are called absolute detectors because unlike an incremental detector, absolute detectors "know" where they are at the moment that power is supplied. In other words, a sampling of the detector readouts provides an absolute reading of rotational position which is accurate, in this instance, to within 22.5 degrees. This is in contrast to an incremental detector which must pass by some indexing reference mark before the system is able to determine its rotational position as will be discussed later.

Track pair 58 of FIG. 2 provides for "fine" absolute detection of the position of the emitter disk 12 relative to the detector plate 16. A sixteen detector array 70 is positioned on the detector plate (FIG. 3) so that as the emitter disk 12 is rotated, the track pair 58 will pass under the detector array 70. The sixteen detectors in the detector array 70 occupy an arc segment of 22.5 degrees which corresponds to the arc length of the segments of the track pair 58. This can best be seen in FIG. 2. The fine detector array 70 can provide an indication of absolute position of the emitter disk 12 to resolution of 22.5/16=1.4062 degrees. In other words, a change will occur in the state or readout of the fine detector array 70, i.e., what the fine detector array "sees" of the track pair 58, every 1.4062 degrees of rotation of the emitter disk 12. This is illustrated in FIG. 5 which shows exemplary readouts of the "fine" detector array and "coarse" detectors for every 1.4 degree rotation of the emitter disk 12. Note that the fine detector array changes states 16 times for every one change of the coarse detectors. Thus, the coarse detectors 56 provide for absolute positioning of the emitter disk 12 within 22.5 degrees of rotation and then the fine detector array 70 provides for absolute positioning of the emitter disk 12 within the identified 22.5 degree arc to a resolution of 1.4 degrees.

The final track pair 62 shown in FIG. 2 is for high resolution incremental positioning (determining position) of the emitter disk 12 within the 1.4 degree arc determined by the coarse detectors 56 and the fine detector array 70. This will be discussed in further detail later.

FIG. 3 is a top plan view of the detector plate 16 of FIG. 1. The detector plate 16 includes an annular conductive sheet 80 (coupling sheet) which, when the detector plate 16 is mounted in the transducer assembly of FIG. 1, will face the conductive sections on the emitter disk 16. The annular conductive sheet 80 is electrified by a square wave voltage signal from a signal source (not shown) by methods well known to those skilled in the art. Electrifying the conductive sheet 80 causes it to produce an electric field which results in the capacitive coupling of the annular conductive sheet 80 to the metallized portions of the emitter disk 12 to thus cause the conductive sections of the tracks 54, 58 and 62 to develop electric fields which are, in turn, directed back towards the detector plate 16.

Also disposed on the detector plate 16 are the plurality of absolute coarse detectors 56, the absolute fine detector array 70, and diametrically opposite high resolution incremental detector arrays 74 and 78. As already described, as the emitter disk 12 is rotated, the detectors detect variations in the location of electric fields produced by the track sections, not variations in field strength or phase. As should be obvious from the layout of the detectors 56, 70, 74 and 78, they are arranged so as to be able to detect electric fields from the corresponding coarse, fine and high resolution track pairs on the emitter disk 12.

Figure 6:
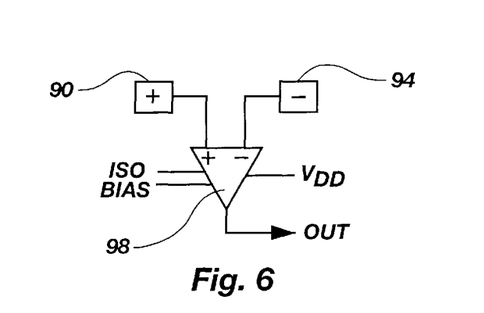
FIG. 6 is a block diagram schematic view of a detector element made in accordance with the principles of the present invention.

Each detector element or sensor in the detector arrays includes two electric field sensing elements 90 and 94 as shown in block diagram FIG. 6, each being disposed over a respective track of a complementary pair for intercepting electric fields emanating from the tracks. Each sensor in the arrays also includes a regenerative differential amplifier 98, coupled to the sensing elements 90 and 94. With this configuration, the sensing elements 90 and 94 will sense opposite conditions since the two tracks over which they are positioned are conjugate. That is, when one sensing element senses an electric field from an electrified section, the other sensing element will be sensing only a small stray absence of electric field from the fringes of a nearly electrified section. Thus, signals of different magnitude (for example a larger and a smaller signal) will be supplied by the sensing elements 90 and 94 to the differential amplifier 98. The differential amplifier 98, in turn, produces an output signal representing the difference between values of the input signals. The use of conjugate tracks and differential amplifiers to sense the electric fields improves reliability in sensing small differences between electric fields over a larger range of gaps between the emitter disk and sensor disk than would be achievable if only single tracks were used.

Figure 7:
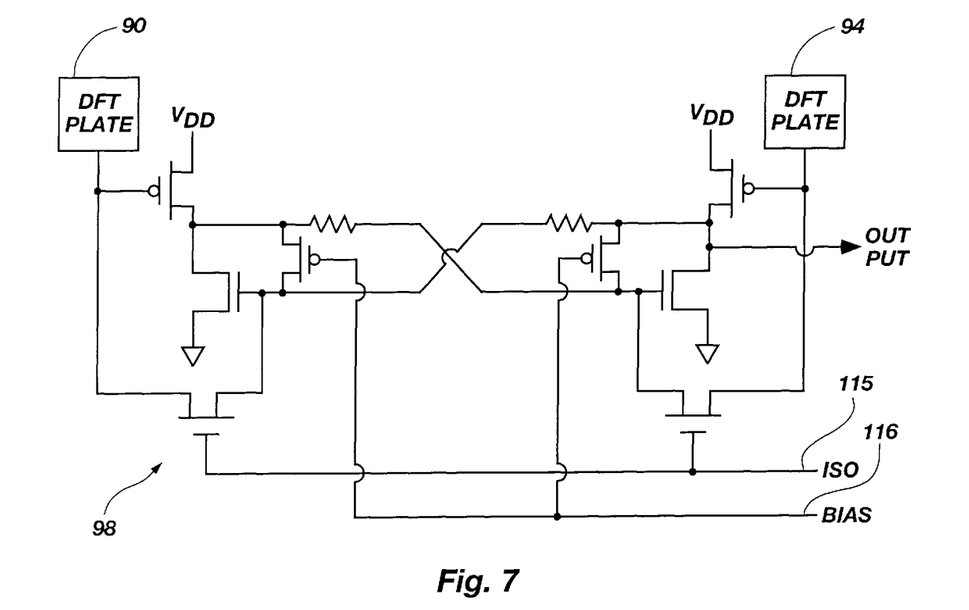
FIG. 7 is a detailed schematic view of the detector element of FIG. 6.

FIG. 7 provides a detailed schematic diagram of the sensor circuit shown in FIG. 6. Before the sensor elements 90 and 94 can be used, both are simultaneously connected to a bias voltage. The bias is evenly balanced for each of the sensor elements 90 and 94. After balancing of the circuit, the sensor elements 90 and 94 are then isolated from each other, and from the bias source. After sensor elements 90 and 94 are isolated, the square-wave signal from the emitter plate is capacitively coupled to the sensing plates. The sensor elements 90 and 94 each respectively amplify the voltage on their respective sensor element. The amplified output of sensor elements 90 and 94 is then latched, resulting in the state of the latch being determined by the difference of the amplified outputs. Each latch quantizes this difference to a binary 0 or 1 state. A plurality of differential sensors produce digital signals which define the absolute or incremental rotary position of the connected shaft, as previously discussed.

Figure 8:
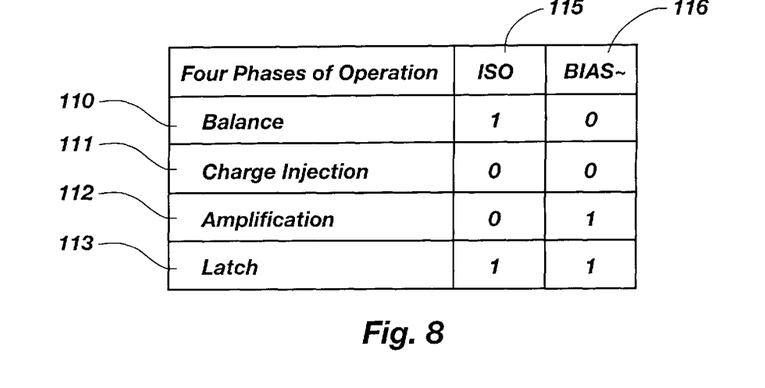
FIG. 8 is a table showing inputs to the circuit of FIGS. 6 and 7 which are required for detection of rotary displacement.

More specifically, there are shown in FIG. 8 the four phases of operation of sensor elements 98. The four phases are shown in the order in which they occur, and are the balance phase 110, the charge injection phase 111, the amplification phase 112 and the latching phase 113. Four phases requires two inputs to the differential amplifier of FIG. 7. They are the ISO 115 or isolate input and the BIAS 116 input. The table of FIG. 8 is rather self-explanatory in that the combinations of signal or no signal on the two inputs activates the appropriate transistors within the sensor elements 90 and 94 to produce the desired result as will be understood by those skilled in the art.

A significant feature which is different from the prior art and which provides a distinct advantage to the present invention is the placement of the sensor element circuitry 98 shown in FIG. 7. The circuitry is placed on the opposite side of the detector plate 16 from the emitter disk 12. The sensor circuitry is thus advantageously shielded from stray capacitive coupling to the electric fields generated between the emitter disk 12 and detector plate 16. It is also an important feature that the intrinsic circuitry comprising the sensor element circuitry 98 be symmetric in construction such that the operation of the differential amplifier 98 is within close tolerances. This avoids bias in balanced sensor elements 90 and 94 which can give false position indication signals.

Figure 9:
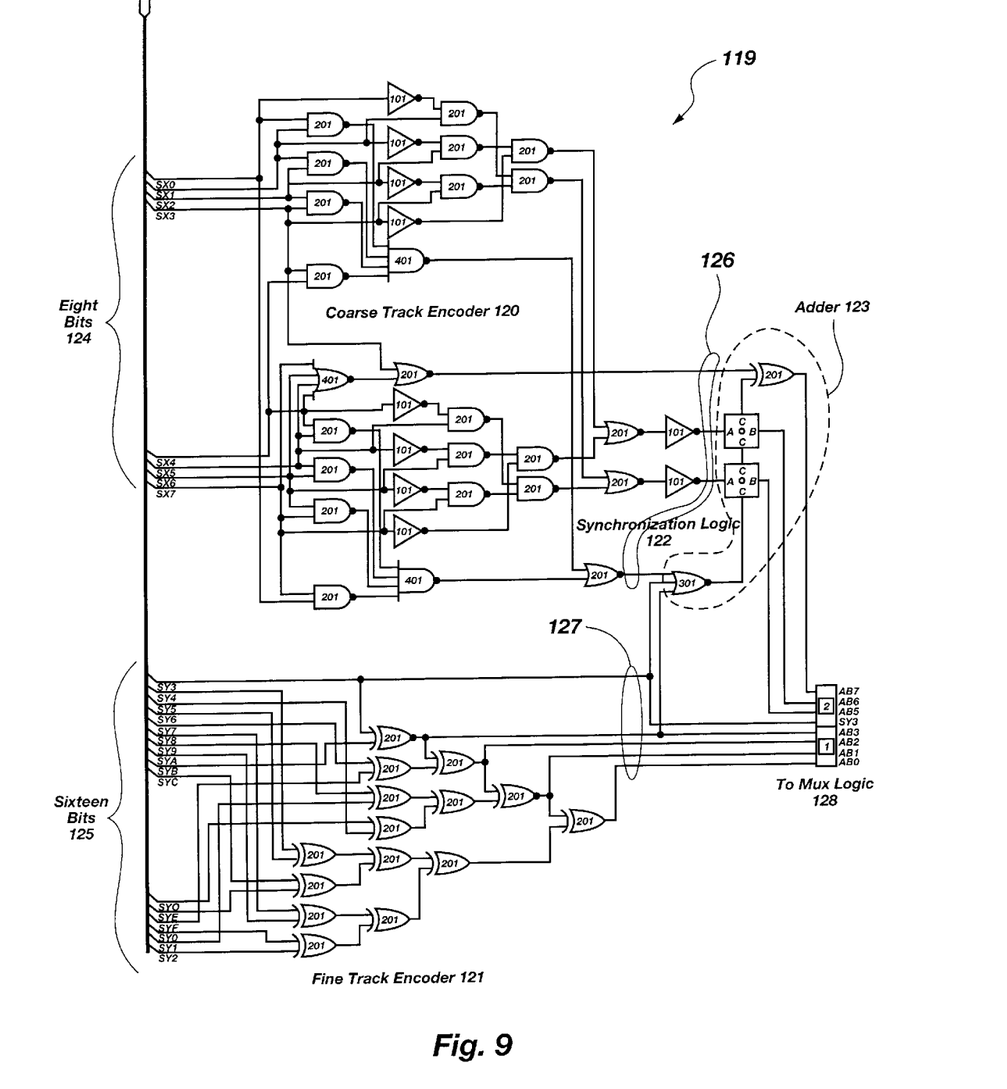
FIG. 9 is a schematic view of decoding circuitry which may be used for synchronizing coarse and fine emitter disk tracks and absolute detectors in accordance with the principles of the present invention.

The sensors, including the sensing elements 90 and 94 and differential amplifiers 98, are fabricated on the detector plate 16 utilizing very large scale integration (VLSI) manufacturing techniques. The output of the sensors are supplied to interpretation logic which may also be fabricated on the detector plate (identified, for example, as circuit logic 102 in FIG. 3) using VLSI techniques. Such interpretation or processing logic is shown in FIG. 9 to include a coarse track encoder 120, a fine track encoder 121, synchronization logic 122 and a rounding circuit (adder) 123. As one skilled in the art will appreciate, the circuit diagram of FIG. 9 implements a system to compensate for run out. This is accomplished by having redundant information in the circuitry of FIG. 9 available for synchronization.

Stated differently, rotary displacement determining systems must compensate for run out because the emitter disk 12 eccentricity causes the sensor elements 98 of the detector plate 16 to be misaligned with the emitter disk 12. Thus, in the present invention, misalignment causes coarse track transitions to occur early or late, depending upon where run out occurs with respect to fine track transitions. Experimentally, the result is that it is possible for the track transition of the coarse tracks to wander plus or minus a quarter of a period from the true track transition time if due to run out, without affecting the answer reported as the position.

The circuit of FIG. 9 shows eight bits of coarse detector information 124 and sixteen bits of fine detector information 125. These bits are sent to encoder circuitry 120 and 121 respectively. As discussed previously in reference to FIG. 4, resolution of the rotary position can be determined to be in one of sixteen different sectors using the eight coarse detectors 56. In the coarse track encoder circuitry 120, these sixteen sectors can be represented by a four bit binary number 126. Likewise, the fine detector array 70 with its sixteen detectors can determine that the emitter disk 12 is in any one of thirty two different positions within the sixteen different sectors. Thirty two positions are represented by a five bit binary number 127. The result is that the rotary position of the emitter disk 12 is determinable to (16×32) 512 positions.

However, FIG. 9 also shows that the resolution of the coarse and fine encoders 120 and 121 is only utilized to a resolution of 256 positions. This is because 256 positions are representable by 8 bits of the output 128. Yet 9 bits of resolution are available (4 coarse bits 126 and 5 fine bits 127). Advantageously, 1 position bit is dropped and instead used for synchronization of the coarse and fine detectors 56 and 70. By sacrificing some resolution, the present invention is assured of synchronous output. Synchronization is accomplished, as will be appreciated by those skilled in the art, by a combination of the synchronization circuitry and the adder or rounding circuitry 123. Thus, the 8 bit signal 128 presented to the MUX logic is the rotary displacement of the emitter disk 12 at a resolution of about 1.4 degrees. The circuitry of FIG. 9 compensates for run out for the coarse and fine sensor element arrays 56 and 70 by discarding one bit of potential resolution.

A third array is available on the same VLSI detector plate 16 of the present invention which combines the advantageous ability of the absolute rotary displacement determining sensor arrays 56 and 70 to know their position upon the application of power to the circuits, with the even greater precision which is achieved using a pair of diametrically opposite incremental or high resolution sensor arrays 74 and 78 (FIG. 3).

The incremental sensor arrays 74 and 78 are used to further refine the rotary position of the emitter disk 12 within the 1.4 degree arc determined by the coarse and fine detector arrays 56 and 70. While it might appear that the greater resolution of the incremental detector arrays 74 and 78 can obtain all of the benefits of the present invention without absolute detectors 56 and 70, an incremental detector array must first be synchronized to some predetermined reference point. In other words, the detector plate 16 must rotate through some unknown arc length until the incremental detector array finds the reference point. The incremental detector array then uses some counting mechanism which is incremented or decremented with respect to the reference point as the detector plate 16 is passed over by the emitter disk 12.

One of the problems with an incremental detector is that if it loses the reference point (becomes unsynchronized), the detector plate 16 must reorient itself by finding the reference point again. Typically, incremental detectors only have a single reference point. Therefore, the detector plate may have to rotate up to one complete revolution before the synchronization track is located. This wasted time is not only intolerable, it can be dangerous if, for example, a robotic arm must turn completely. The arm might strike objects or spill materials before its rotary position is determined. The present invention advantageously combines the incremental detector arrays 74 and 78 with the absolute detector arrays 56 and 70 on a single VLSI detector chip 16.

In the preferred embodiment, the incremental detector array system is comprised of two diametrically opposite detector arrays 74 and 78 of sixteen sensor elements 98 each. The aspect of using diametrically opposite detectors is well known in the prior art. However, the present invention is able to tolerate a higher degree of run out than conventional analog rotary detector systems. The reason for the significant increase in run out tolerance is the advantageous method of determining a rotary position used by the present invention. Specifically, the method takes advantage of the redundant position information provided by the diametrically opposite detectors arrays 74 and 78 as will be explained.

Figure 10:
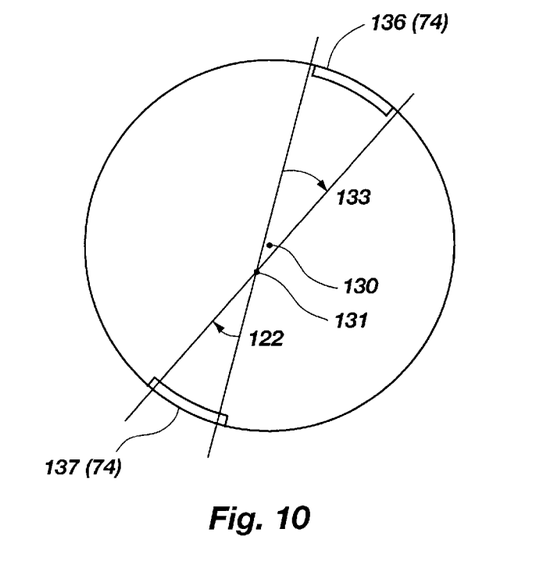
FIG. 10 is a diagram showing how run out causes different amounts of data to be detected by the incremental detector arrays.

FIG. 10 illustrates how run out causes the diametrically opposite incremental detector arrays 74 and 78 to report different rotary displacements for the emitter disk 12. The emitter disk 12 is shown with an exaggerated amount of run out. Instead of rotating about the center 130 of the emitter disk 12, the disk rotates about point 131. Run out causes the angle subtended by arc 132 to be smaller than the angle subtended by arc 133.

Figure 11:
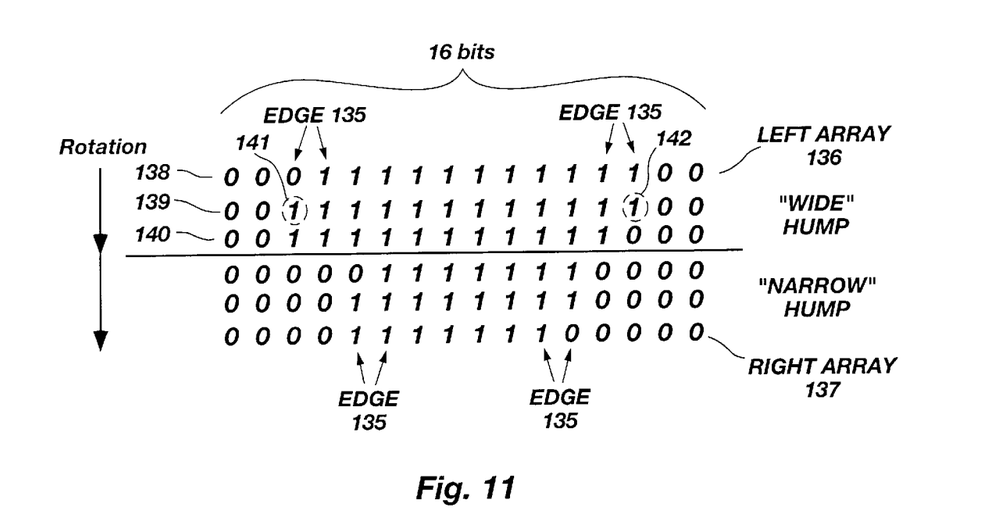
FIG. 11 is a table showing the "wide" and "narrow" data humps detected in FIG. 10.

FIG. 11 shows that it is the edges 135 of the reported rotary position which run out can cause to be in error. FIG. 11 also illustrates the rotary position reported by the left incremental detector array 78 over the larger subtended arc 133 as being a wide hump. In contrast, the rotary position reported by the right incremental detector 137 over the smaller subtended arc 132 is seen as a narrow hump because of run out. Without run out, the humps 149 would be the same width, and transitions to 0 or 1 on the left and right edges 135 would occur simultaneously. However, as shown in FIG. 11, the left edge 141 of line 139 transitions to a 1, while the right edge 142 of line 139 does not transition to a 0 until the rotation of the emitter disk has advanced as shown on line 140. The important feature to note is that the edges 135 of the humps can change early or late because of the angular shift induced by run out.

Figure 12:
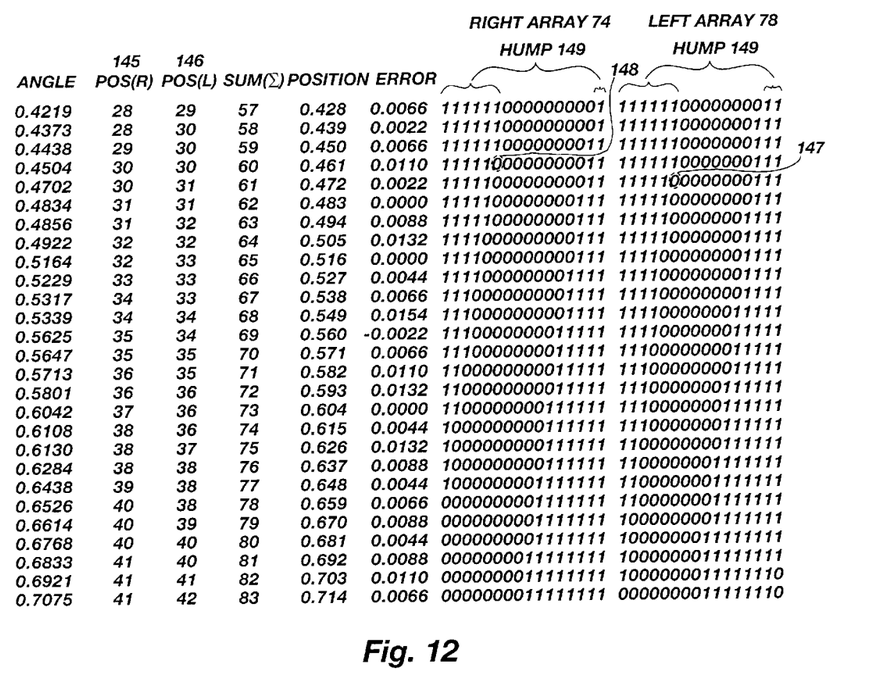
FIG. 12 is a table showing experimentally produced run out induced errors for different emitter disk rotation angles.

This feature is also shown in FIG. 12 which is a table of experimental values showing run out caused errors. For example, the columns POS(R) 145 and POS(L) 146, representing the positions in decimal detected by the right and left arrays respectively, should transition equally. However, column 146 POS(L) is clearly transitioning early with respect to angular position, while POS(R) 145 is transitioning late with respect to angular position.

Figure 13:
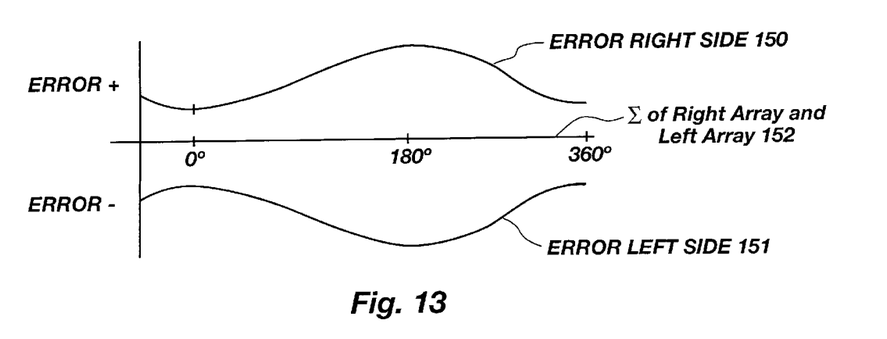
FIG. 13 is a graph demonstrating the principle used by the present invention to compensate for run out.

The present invention compensates for run out as shown in FIG. 13. Run out is represented as a sinusoidal error induced phase shift 150 and 151. Using diametrically opposite detector arrays 74 and 78, the present invention sums the position from both arrays 74 and 78, and then divides by two. The position should then be represented by the straight line 152, where the net error goes to zero. These results are confirmed experimentally in FIG. 12. The listing of experimentally obtained values shows the positions 145 and 146 determined by an arbitrarily named left detector array 78, the diametrically opposed right detector array 74, and the equivalent and respective positions POS(R) 145 and POS(L) 146. Without run out, the positions in columns 145 and 146 would always be equal. Circle 147 indicates an early transition of an edge for the left detector array 78, and circle 148 indicates an early transition of an edge for the right detector array 74.

Because of the varying width of the humps 149 due to run out, it is necessary for the present invention to devise an encoding scheme for the incremental detector which avoids a direct and cumbersome look-up table for determining the actual position of the center of the hump which has been compensated for run out. A direct look-up, for example, would have 16 incremental detectors (thus data bits) mapping out to 65,536 possible positions ($2^{16}$=65,536). Where 5 bits are needed to represent the 32 possible transitions which can occur in the rotary position, a ROM of 5×65,536=328K bits would be required, an impractically large ROM.

Figure 14:
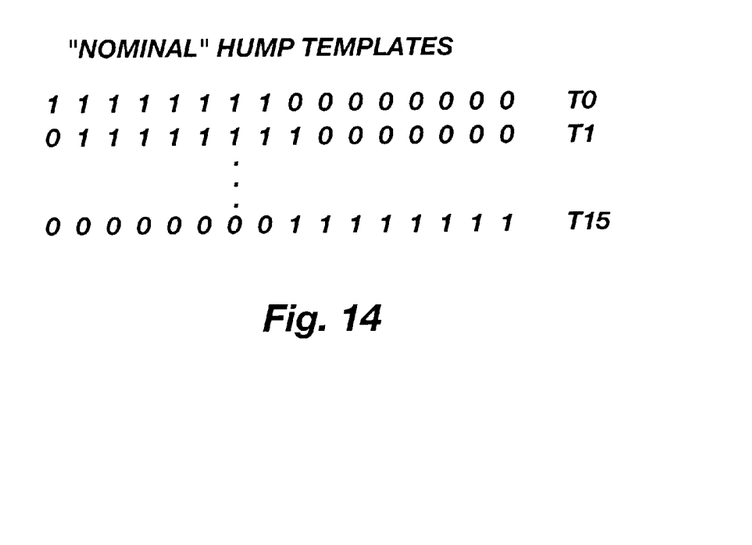
FIG. 14 is a table of "normal" hump templates.
Figure 15:
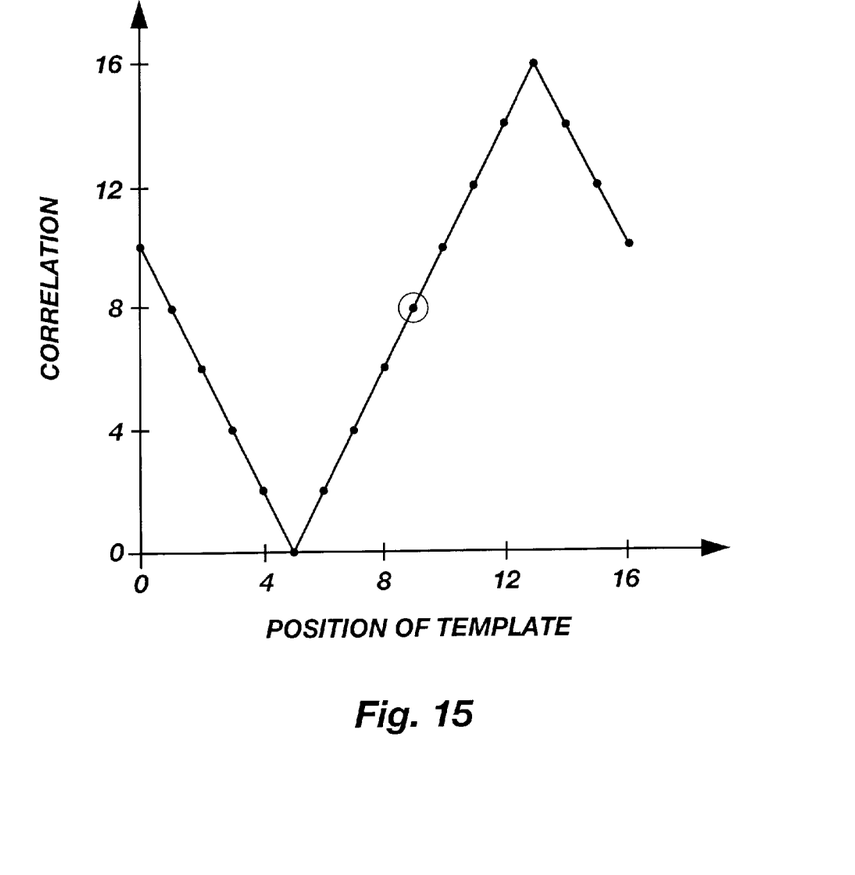
FIG. 15 is a graph of the correlation function.

The present invention advantageously uses a correlation algorithm to determine and encode the position of the hump for each incremental encoder, and thus the rotary displacement of the emitter disk. First, sixteen nominal (no run out) hump templates T0–T15 are created as shown in FIG. 14. The next step is to use a bitwise EXOR (compare) of all sixteen (T0–T15) possible positions of the template with the actual incremental detector values, and is represented by the formula:

$$\sum_{n=0}^{15} T(m) \oplus \mathrm{DET}(n)$$

where m is the number of emitter fingers and n is the number of sensor elements. The resulting correlation function produces 17 possible answers. Rather than actually evaluating the correlation function for all sixteen values of (n), a modified binary search is used to converge on the center of the hump. Evaluating the correlation function for all sixteen possible positions produces the plot shown in FIG. 15. The position of the hump 149 is defined as the template position which gives a correlation value of 8 on the upward slope because this value has been determined to be when the hump 149 is in quadrature with the templates.

There are several advantages to the process above. First, the diametrically opposite incremental detectors 74 and 78 compensate for run out in an efficient manner by avoiding a bulky and more costly look-up table procedure as described above. Second, the present invention avoids the situation whereby an incremental detector array 75 must reorient itself by moving through an unknown amount of rotation (arc length) to find the reference point. The present invention in effect has 256 absolute reference points which enable the incremental detectors 74 to rapidly reindex on the next transition of the absolute detectors 56 and 70. At stated before, this process requires the emitter disk 12 to at most travel through 1/256th of a revolution, or roughly 1.4 degrees. Third, the present invention tolerates more run out because the present invention is able to combine the information from absolute 56 and 70 and incremental detector 74 and 78 arrays.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. Rotary displacement measuring apparatus comprising:
   a shaft whose rotary displacement is to be measured, said shaft mounted to rotate about its long axis,
   a generally planar emitter disk mounted at its center on the shaft to rotate in the plane defined by the emitter disk and to develop and direct predetermined electric field patterns normally from an active side of the emitter disk, said emitter disk comprising
   a disk mounted generally at its center to the shaft, and emitter element sections formed in a plurality of concentrically disposed, selectively segmented radial tracks on the active side of the disk to develop the electric field patterns in response to electric input signals, said emitter element sections being electrically coupled together to enable development of substantially uniform electric fields from all emitter element sections,
   a generally planar detector plate disposed in a fixed position about said shaft, generally parallel with the emitter disk on the active side thereof and disposed so as to enable a sensing means disposed on the detector plate to detect locations of the electric field patterns as the emitter plate is rotated and for producing output signals representing the electric field patterns detected and thus rotary displacement of the shaft, said sensing means comprising at least two absolute detectors and at least two incremental detectors, wherein the at least two incremental detectors produce output signals having a higher resolution of rotary displacement relative to the at least two absolute detectors, and
   means for supplying electric field input signals to the emitter element sections.

2. The apparatus as in claim 1 further including bias means disposed about the shaft to rotate as the shaft is rotated, said bias means being coupled to the emitter disk which is moveable axially to force the disk into sliding contact with the detector plate.

3. The apparatus as in claim 2 wherein said bias means comprises:
   a thrust plate disposed about the shaft adjacent the emitter disk on the side opposite the active side; and
   torsionally stiff and longitudinally elastic spring means disposed between the thrust plate and emitter disk to urge the emitter disk against the detector plate.

4. The apparatus as in claim 2 further comprising a wear-resistant film disposed over the detector plate.

5. The apparatus as in claim 1 wherein said emitter disk includes a raised central section for contacting the detector plate when disposed theretoward, said apparatus further including bias means disposed about the shaft to rotate as the shaft is rotated, said bias means being coupled to the emitter disk to force the disk toward the detector plate so that the raised central section makes sliding contact with the detector plate to maintain the remainder of the emitter disk out of contact from the detector plate.

6. The apparatus as in claim 1 wherein said electric field input signal supplying means comprises:
   a conductive layer of material disposed on the detector plate on the side facing the active side of the emitter disk for developing an electric field to capacitively couple the conductive layer and the emitter element sections when a voltage signal is supplied to the conductive layer, said emitter element sections thereby developing electric fields; and
   voltage supply means for supplying a voltage signal to the conductive layer of material.

7. The apparatus as in claim 1 wherein the segmented radial tracks of the emitter disk are formed into a plurality of complementary pairs of tracks, and wherein said sensing means disposed on the detector plate comprises:
   a first plurality of pairs of sensors, each pair being positioned adjacent a first pair of complementary tracks at spaced-apart locations to detect electric fields which may emanate from said tracks;
   a second plurality of pairs of sensors, each pair being positioned adjacent a second pair of complementary tracks at spaced-apart locations to detect electric fields which may emanate from the second pair of tracks; and
   a plurality of regenerative differential amplifier means, each coupled to a respective pair of sensors for producing an output signal representing the difference between electric fields detected by the pair of sensors.

8. The apparatus as in claim 7 wherein each track of the first pair comprises two circumferentially aligned segments, conjugate with the segments of the respective tracks of the first pair, one of the two segments of each track forming an arc which is shorter than the arc of the other segment of each track, wherein the second pair of tracks includes a plurality of conjugate uniformly spaced-apart segments, the arc-length of the segments of the second pair of tracks being shorter than the arc-length of said one of the two segments of the first pair of tracks, wherein the first plurality of pairs of sensors are uniformly spaced apart circumferentially on the detector plate such that as the detector plate is rotated relative to the emitter disk, no more that two pairs of sensors of the first plurality will lie adjacent said one of the two segments of the first pair of tracks at any one time, for detecting transitions between the one segment and the other segment of the first pair of tracks, and wherein the second plurality of pairs of sensors are disposed in an arc on the detector plate adjacent the second pair of tracks, the arc formed by the second plurality of pairs of sensors being substantially the same length as the arc length of each segment of the second pair of tracks, for detecting movement of the transitions between segments of the second pair of tracks past each of the pairs of sensors of the second plurality, as the emitter disk plate is rotated.

9. The apparatus as in claim 1 wherein the at least two absolute detectors comprises at least two coarse absolute detectors and at least two fine absolute detectors, the at least two fine absolute detectors producing output signals having a higher resolution of rotary displacement relative to the at least two coarse absolute detectors.

10. The apparatus as in claim 9 wherein the at least two incremental detectors comprises two diametrically opposite incremental detectors disposed on the detector plate.

11. The apparatus as in claim 1 wherein the emitter disk is composed of aluminum oxide.

12. The apparatus as in claim 1 wherein the detector plate is composed of silicon suitable for the manufacture of VLSI circuitry thereon.

13. The apparatus as in claim 4 wherein the wear resistant film is composed of silicon nitride.

14. A method for determining rotary displacement comprising:
   a) positioning a shaft whose rotary displacement is to be measurement such that it is disposed to rotate about its long axis;
   b) mounting an emitter disk generally at its center on the shaft, wherein an active side develops an electric field, and wherein the emitter disk has formed on the active side a plurality of concentrically disposed, selectively segmented radial tracks which develop the electric field in response to electric field input signals;
   c) mounting a generally fixed detector plate with a surface disposed generally parallel to the emitter disk on the shaft, such that a sensing means disposed on the detector plate detects electric fields generated by the emitter disk segmented tracks as the emitter disk is rotated, said sensing means comprising at least one absolute detector and at least one incremental detector which produces an output signal having a higher resolution of rotary displacement relative to the at least one absolute detector; and
   d) decoding information from the sensing means so as to infer the rotary displacement of the emitter disk.

15. The method as defined in claim 14 wherein the step of causing the emitter disk to generate an electric field comprises the more specific step of interconnecting all of the segmented tracks to create a generally uniform electric field and to thereby decrease the complexity of electric field generating circuitry.

16. The method as defined in claim 14 wherein the step of forming a plurality of concentrically disposed, segmented radial tracks comprises the more specific step of reducing a total number of said tracks so as to minimize affects of run out.

17. The method as defined in claim 14 wherein the step of placing at least one absolute detector and at least one incremental detector on the detector plate comprises the more specific steps of:
   a) placing at least one coarse absolute detector and at least one fine absolute detector with associated absolute rotary position determining circuitry and at least one incremental detector with associated incremental rotary position determining circuitry on the same detector plate;
   b) synchronizing the at least one coarse absolute detector, the at least one fine absolute detector, and the at least one incremental detector; and
   c) determining a rotary displacement based on data from a combination of the at least one coarse absolute detector, the at least one fine absolute detector and the at least one incremental detector.

18. The method as defined in claim 17 wherein the step of synchronizing the at least one coarse absolute detector, the at least one fine absolute detector and the at least one incremental detector comprises the more specific step of creating a plurality of reference points from coarse and fine absolute detector information such that the at least one incremental detector can be reindexed at a plurality of rotary positions.

19. The method as defined in claim 18 wherein the step of synchronizing the at least one coarse absolute detector, the at least one fine absolute detector and the at least one incremental detector comprises the more specific step of dropping one bit of rotary position information to gain synchronization of said absolute course and fine detectors.

20. The method as defined in claim 14 wherein the step of detecting electric fields generated by the emitter disk segmented tracks as the emitter disk is rotated comprises the more specific step of using complementary segmented track pairs to increase reliability of signals detected from the emitter disk.

21. The method as defined in claim 20 wherein the step of determining rotary displacement using complementary segmented track pairs comprises the more specific step of using a plurality of regenerative differential amplifiers as the sensing means to determine transitions defining the passage of complementary segmented track pairs over the sensing means of the detector plate.

22. The method as defined in claim 21 wherein the step of determining rotary displacement using a plurality of regenerative differential amplifiers comprises the more specific steps of:
   a) balancing the plurality of regenerative differential amplifier, each having a first input from a first track of a first complementary track pair and a second input from a second track of the first complementary track pair;
   b) isolating each of the regenerative differential amplifier inputs;
   c) coupling the square-wave signal capacitively from the emitter disk to the detector disk;
   d) amplifying a difference in charge detected at the first and second inputs to the plurality of regenerative differential amplifier; and
   e) latching the amplified charge difference.

23. The method as defined in claim 21 wherein the step of determining rotary displacement comprises the more specific step of shielding the plurality of regenerative differential amplifiers from electric fields of the emitter disk which might cause erroneous signals by placing the plurality of regenerative differential amplifiers on a side of the detector plate opposite from a side facing the emitter disk.

24. The method as defined in claim 14 wherein the step of determining rotary displacement comprises the specific step of reducing the number of segmented tracks to reduce susceptibility to run out induced errors by combining absolute and incremental detectors on the same detector plate.

25. The method as defined in claim 14 wherein the step of determining rotary displacement comprises the specific step of using geometric quantization so as to directly determine the rotary displacement in digital form.

26. The method as defined in claim 14 wherein the step of determining rotary displacement comprises the specific step of compensating for run out by summing a position of the emitter disk as determined by two diametrically opposite detectors on opposite sides of the detector plate and dividing by two.

27. The method as defined in claim 26 wherein the step of determining rotary displacement comprises the specific step of utilizing two diametrically opposite incremental detectors to compensate for run out.

28. The method as defined in claim 14 wherein the step of determining rotary displacement comprises encoding the rotary displacement using a correlation function defined by the steps of:
   a) making sixteen nominal hump templates; and
   b) applying a bitwise exclusive-or compare defined by the equation where m equals the number of fingers on the emitter disk and n equals the number of detectors; and
   c) locating the hump by applying a modified binary search to converge on the hump.

29. The method as defined in claim 17 wherein the step of determining rotary displacement comprises encoding rotary displacement information from at least one coarse absolute detector and at least one fine absolute detector, and comprises the more specific steps of:
   a) encoding coarse track information;
   b) encoding fine track information;
   c) synchronizing the coarse and fine track information; and
   d) combining the synchronized information in a rounding circuit.

* * * * *